United States Patent
Drake et al.

(10) Patent No.: US 9,777,634 B2
(45) Date of Patent: Oct. 3, 2017

(54) TUBE FED TANGENTIAL ON-BOARD INJECTOR FOR GAS TURBINE ENGINE

(71) Applicant: United Technologies Corporation, Hartford, CT (US)

(72) Inventors: Christopher Drake, East Hartford, CT (US); Christopher B. Lyons, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 524 days.

(21) Appl. No.: 14/479,566

(22) Filed: Sep. 8, 2014

(65) Prior Publication Data

US 2015/0068210 A1    Mar. 12, 2015

Related U.S. Application Data

(60) Provisional application No. 61/876,941, filed on Sep. 12, 2013.

(51) Int. Cl.
    *F01D 5/08*    (2006.01)
    *F02C 7/22*    (2006.01)
    *F02C 7/18*    (2006.01)

(52) U.S. Cl.
    CPC .............. *F02C 7/18* (2013.01); *F01D 5/082* (2013.01); *F02C 7/22* (2013.01)

(58) Field of Classification Search
    CPC .. F01D 5/081; F01D 5/082; F02C 7/18; F02C 7/185
    See application file for complete search history.

(56) References Cited

U.S. PATENT DOCUMENTS

| | | | | |
|---|---|---|---|---|
| 4,178,129 A | * | 12/1979 | Jenkinson | F01D 5/081 416/193 A |
| 4,236,869 A | * | 12/1980 | Laurello | F01D 5/081 415/115 |
| 4,526,511 A | | 7/1985 | Levine | |
| 4,541,774 A | * | 9/1985 | Rieck | F01D 5/085 415/115 |
| 4,708,588 A | * | 11/1987 | Schwarz | F01D 5/081 415/115 |
| 6,050,079 A | * | 4/2000 | Durgin | F02C 7/125 415/115 |
| 6,468,032 B2 | * | 10/2002 | Patel | F01D 5/081 415/115 |
| 6,468,037 B1 | | 10/2002 | Link | |

(Continued)

FOREIGN PATENT DOCUMENTS

WO    2014051690    4/2014

OTHER PUBLICATIONS

U.S. Appl. No. 11/505,677, filed Aug. 17, 2006 Dropped Jul. 17, 2009 Titled: Preswirl Pollution Air Handling With Tangential On-Board Injector for Turbine Rotor Cooling.

(Continued)

*Primary Examiner* — Igor Kershteyn
(74) *Attorney, Agent, or Firm* — Carlson, Gaskey & Olds, P.C.

(57) ABSTRACT

A tangential on-board injector assembly for a gas turbine engine includes an annular housing including a plenum. A plurality of discrete tubes is fluidly connected to the plenum and is configured to provide a cooling fluid to the annular housing.

17 Claims, 3 Drawing Sheets

(56) References Cited

U.S. PATENT DOCUMENTS

| | | | |
|---|---|---|---|
| 6,981,841 B2 | 1/2006 | Krammer et al. | |
| 8,162,605 B2 * | 4/2012 | Alvanos | F01D 25/24 415/213.1 |
| 8,307,662 B2 * | 11/2012 | Turco | F01D 5/081 60/782 |

OTHER PUBLICATIONS

PCT Application No. PCT/US2014/037231 filed May 8, 2014 Titled: Diffuser Case Strut for a Turbine Engine.
PCT Application No. PCT/US2014/049334 filed Aug. 1, 2014 Titled: Diffuser Case Mixing Chamber for a Turbine Engine.
PCT Application No. PCT/US2014/050839 filed Aug. 13, 2014 Titled: Gas Turbine Engine Duct Assembly.

* cited by examiner

TUBE FED TANGENTIAL ON-BOARD INJECTOR FOR GAS TURBINE ENGINE

CROSS-REFERENCE TO RELATED APPLICATIONS

This application claims priority to U.S. Provisional Application No. 61/876,941, which was filed on Sep. 12, 2013 and is incorporated herein by reference.

STATEMENT REGARDING FEDERALLY SPONSORED RESEARCH OR DEVELOPMENT

This invention was made with government support under Contract No. FA8650-09-D-29230021 awarded by the United States Air Force. The Government has certain rights in this invention.

BACKGROUND

This disclosure relates to a tangential on-board injector (TOBI). More particularly, the disclosure relates to supplying a cooling fluid to the TOBI.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Historically, a fan in the fan section was driven at the same speed as a turbine within the turbine section. More recently, it has been proposed to include a gear reduction between the fan section and a fan drive turbine. With this change, the diameter of the fan has increased dramatically and a bypass ratio or volume of air delivered into the bypass duct compared to a volume delivered into the compressor has increased. With this increase in bypass ratio, it becomes more important to efficiently utilize the air that is delivered into the compressor section. Military engines also benefit from effective use of compressed air.

One factor that increases the efficiency of the use of compressed air is to have a higher pressure at the exit of a high pressure compressor. This high pressure results in a high temperature increase. The temperature at the exit of the high pressure compressor is known as T3 in the art and the pressure is known as P3. T3 air is sometimes used to cool the turbine section, for example, through a TOBI, as well as provide air for other uses in the engine. The TOBI is used to provide cooling flow for the thermal management of turbine blades. Due to the increased T3 temperature, super-cooled fluid from a heat exchanger has instead been provided to the TOBI and other engine areas. The use of super-cooled cooling fluid makes routing of the cooling fluid in the combustor section more difficult.

SUMMARY

In one exemplary embodiment, a tangential on-board injector assembly for a gas turbine engine includes an annular housing including a plenum. A plurality of discrete tubes is fluidly connected to the plenum and is configured to provide a cooling fluid to the annular housing.

In a further embodiment of the above, a flange extends radially outward from the annular housing. The annular housing includes a circumferential array of tangential on-board injector vanes arranged downstream from the plenum.

In a further embodiment of any of the above, a diffuser case is secured to the flange.

In a further embodiment of any of the above, a circumferential array of turbine vanes is secured to the flange.

In a further embodiment of any of the above, pins removably secure an inner diameter platform of the turbine vanes to the flange.

In a further embodiment of any of the above, the annular housing includes a circumferential array of apertures. The tubes each include a neck received in and sealed relative to the respective aperture.

In another exemplary embodiment, a gas turbine engine includes a combustor section that is arranged fluidly between a compressor section and a turbine section. A cooling fluid source is configured to provide a cooling fluid. A tangential on-board injector has an annular housing including a plenum. A plurality of discrete tubes fluidly connects the cooling fluid source and is configured to provide a tangential on-board injector flow to the plenum.

In a further embodiment of the above, the turbine section includes a rotor that supports turbine blades. The tangential on-board injector is configured to supply the cooling fluid to the rotor.

In a further embodiment of any of the above, the compressor section provides a bleed air that corresponds to the cooling fluid.

In a further embodiment of any of the above, the cooling fluid source includes a heat exchanger.

In a further embodiment of any of the above, a diffuser case is secured to the annular housing and is arranged about a combustor housing in the combustor section.

In a further embodiment of any of the above, the diffuser case is configured to receive a diffuser flow. The diffuser flow is discrete from the tangential on-board injector flow.

In a further embodiment of any of the above, a flange extends radially outward from the annular housing. A circumferential array of turbine vanes is secured to the flange.

In a further embodiment of any of the above, pins removably secure an inner diameter platform of the turbine vanes to the flange.

In a further embodiment of any of the above, the annular housing includes a circumferential array of apertures. The tubes each include a neck received in and sealed relative to the respective aperture. The annular housing includes a circumferential array of tangential on-board injector vanes that are arranged downstream from the plenum.

In a further embodiment of any of the above, a bearing supports the rotor for rotation relative to an engine static structure. The bearing is arranged in a bearing compartment that is configured to receive a buffer flow. The buffer flow is discrete from the tangential on-board injector flow.

In a further embodiment of any of the above, a diffuser case is arranged in the compressor section and is configured to receive a diffuser flow. A bearing supports the rotor for rotation relative to an engine static structure. The bearing is arranged in a bearing compartment that is configured to receive a buffer flow. The diffuser flow and the buffer flow are discrete from the tangential on-board injector flow.

In another exemplary embodiment, a method of supply fluid to a turbine rotor includes the steps of supplying a cooling fluid to a tangential on-board injector through multiple discrete apertures.

In a further embodiment of the above, multiple discrete tubes fluidly connect a cooling fluid source to the tangential on-board injector.

In a further embodiment of any of the above, the step of supplying a diffuser flow and a buffer flow respectively to a diffuser case and a bearing compartment. The diffuser flow and the buffer flow separate from the cooling fluid supply to the tangential on-board injector.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
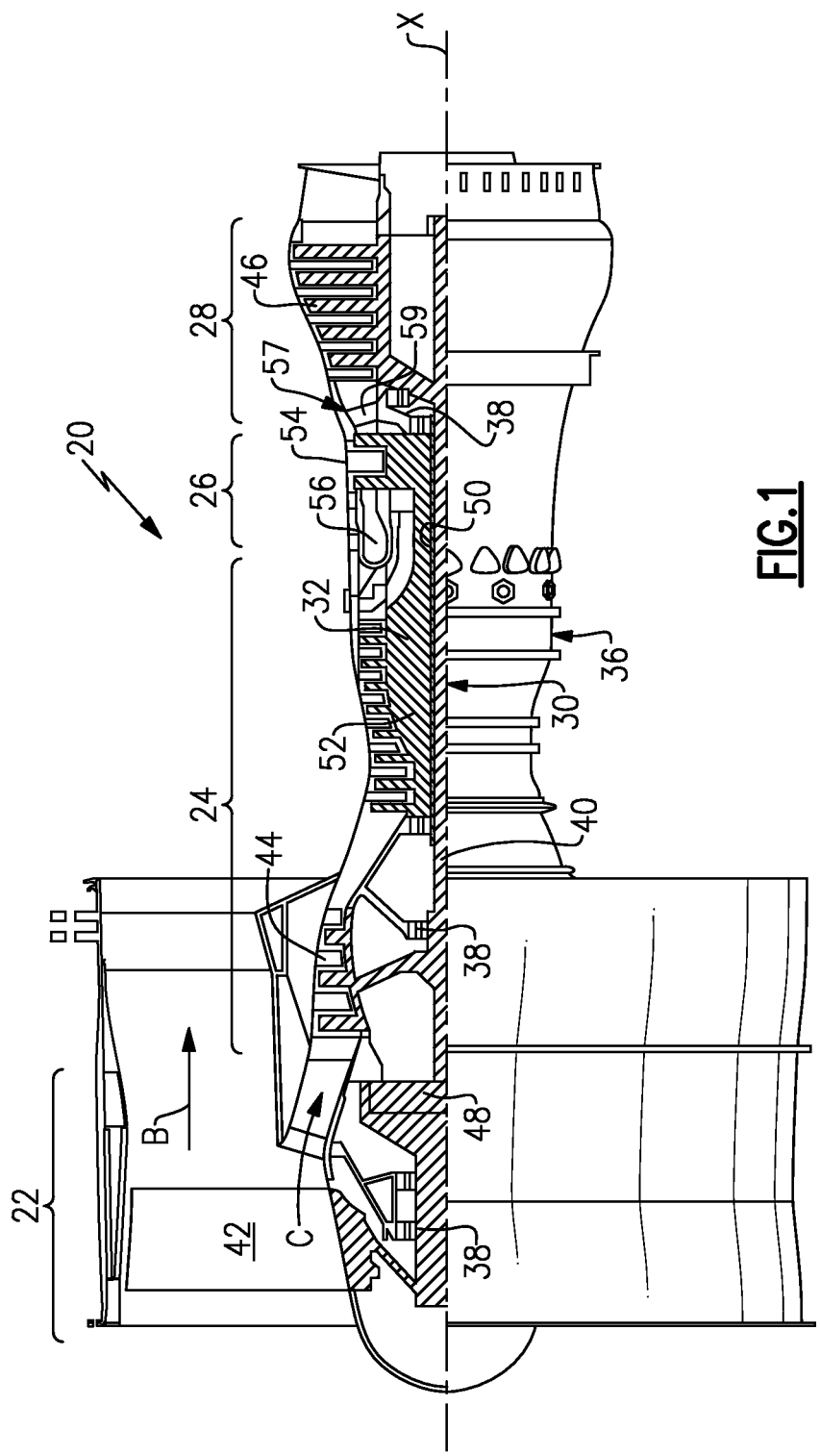
FIG. 1 is a schematic view of an example gas turbine engine including a combustor.

FIG. 1 schematically illustrates a gas turbine engine 20. Although commercial engine embodiment is shown, the disclosed cooling feature may also be used in military engine applications. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Figure 2:
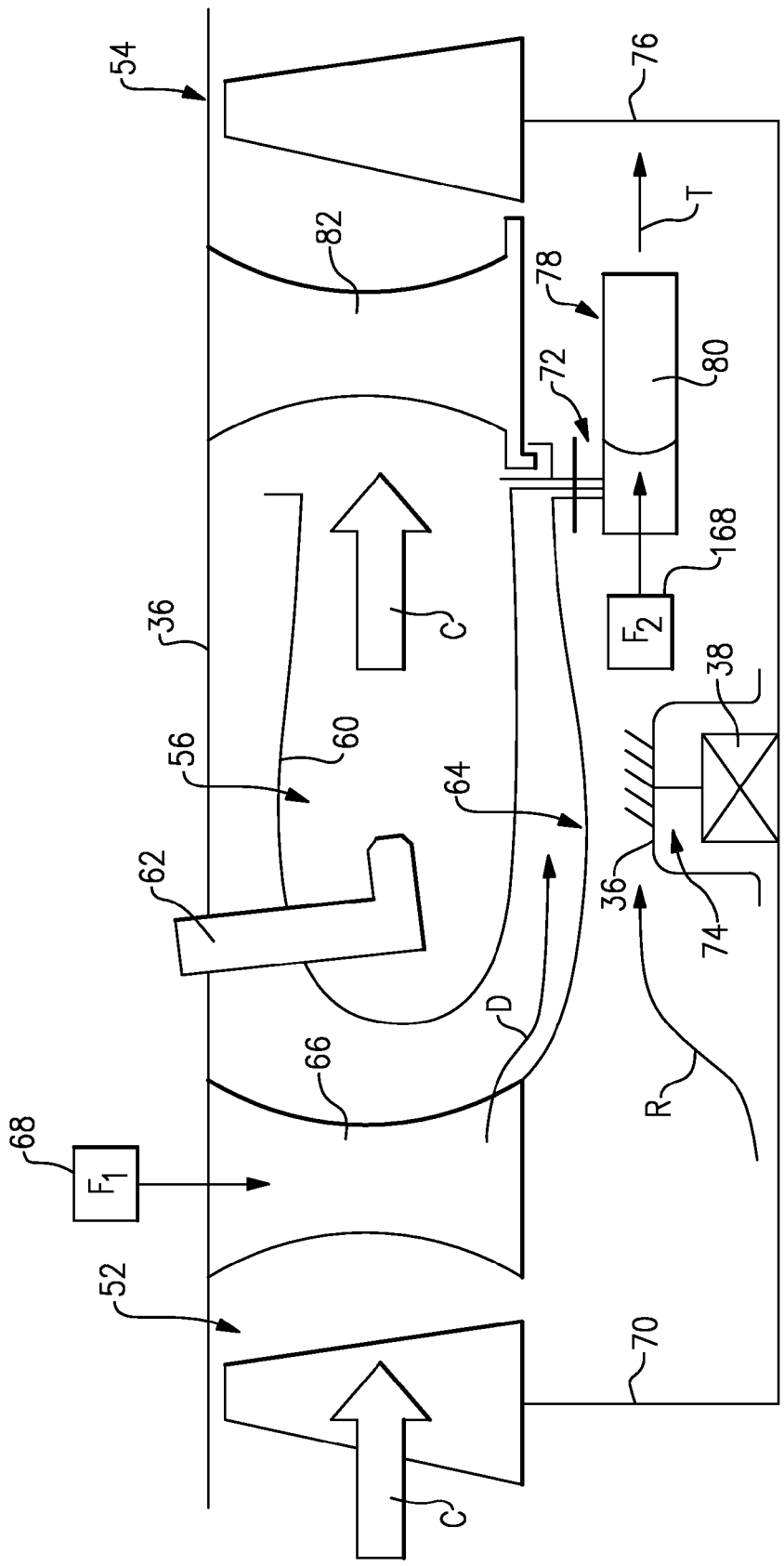
FIG. 2 is an enlarged schematic view of a gas turbine engine in the area of the combustor and a tangential on-board injector (TOBI).

The fan section 22 drives air along a bypass flowpath B while the compressor section 24 drives air along a core flowpath C (as shown in FIG. 2) for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

An area of the combustor section 26 is shown in more detail in FIG. 2. The combustor section 26 includes a combustor 56 having a combustor housing 60. An injector 62 is arranged at a forward end of the combustor housing 60 and is configured to provide fuel to the combustor housing 60 where it is ignited to produce hot gases that expand through the turbine section 54.

A diffuser case 64 is secured to the combustor housing 60 at a joint 72, for example, and forms a diffuser plenum surrounding the combustor housing 60. The diffuser plenum may receive a diffuser flow D for diffusing flow from the compressor section 52 into the combustor section 56. The diffuser case 64 and the combustor housing 60 are fixed relative to the engine static structure 36. The diffuser case 64 includes a portion arranged downstream from the compressor section 52 and upstream from the combustor section 26 that is sometimes referred to as a "pre-diffuser" 66.

The compressor section 52 includes a compressor rotor 70 supported for rotation relative to the engine static structure 36 by the bearing 38. The bearing 38 is arranged within a bearing compartment 74 that is buffered using a buffer flow R.

A cooling fluid source 68, such as fluid from a compressor stage, provides cooling fluid $F_1$ through the pre-diffuser 66, for example, to various locations interiorly of the diffuser case.

The turbine section 54 includes a turbine rotor 76 arranged downstream from a tangential on-board injector module 78, or "TOBI." The TOBI 78 supports a circumferential array of vanes 82 that are arranged in the core flow path upstream from the turbine rotor 76. The vanes 82 provide the first fixed stator stage of the turbine section 54. A cooling fluid source 168 provides a cooling fluid $F_2$ to the TOBI 78. A heat exchanger 106 (shown in FIG. 3) may be used to cool the cooling fluid $F_2$ prior to reaching the TOBI 78. In one example, the cooling fluid sources 68, 168 are the same and are provided by bleed air from engine's compressor.

Figure 3:
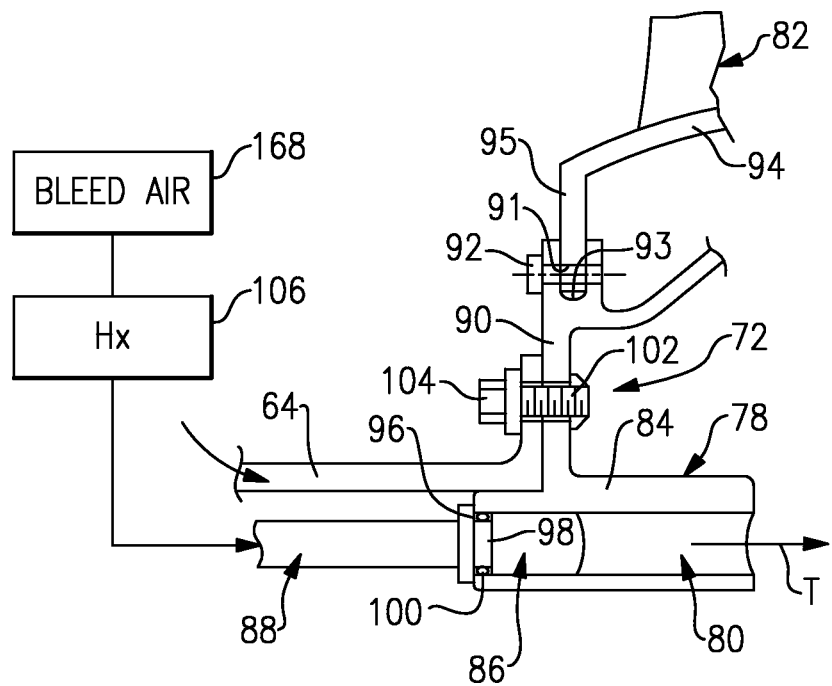
FIG. 3 is an enlarged cross-sectional view of the TOBI shown in FIG. 2.
Figure 4:
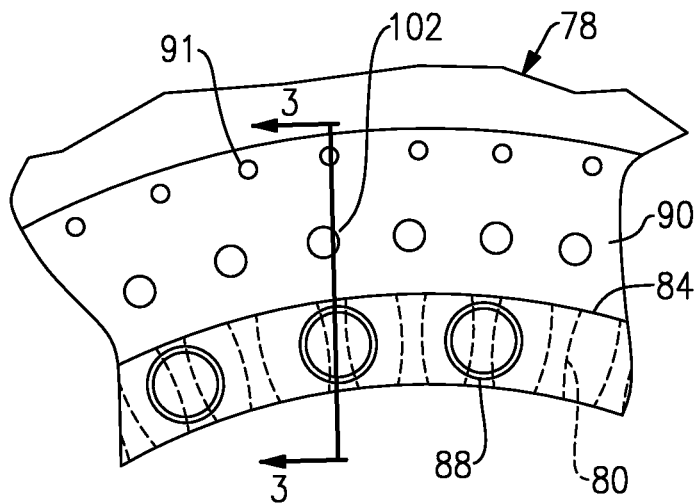
FIG. 4 is an enlarged perspective view of an forward portion of the TOBI shown in FIG. 3.

Referring to FIGS. 3 and 4, the TOBI 78 includes a flange 90 that extends radially outward from an annular housing 84. The diffuser case 64 is secured to the TOBI 78 by fasteners 104 received in corresponding holes 102 of the flange 90 at the joint 72.

The array of turbine vanes 82 is secured to the flange 90. In one example, the flange 90 includes an annular channel 93. A tab 95, which extends radially inward from an inner platform 94, is received in the channel 93. A pin 92 is received in a hole 91 in the flange 90 and a corresponding hole in the tab 95.

The annular housing 84 has a plenum 86. A circumferential array of vanes 80 are arranged downstream from the plenum 86. An array of discrete tubes 88 are fluidly connected to the cooling fluid source 168 and provide a TOBI flow T to the plenum 86 that is used to cool the turbine rotor 76 (FIG. 2). The cooling fluid provided to the TOBI 78, which supplies the TOBI flow, is discrete from the diffuser flow D and the buffer flow R.

The annular housing 84 includes a circumferential array of apertures 96. The tubes 88 each include a neck 98 received in and sealed relative to its respective aperture 96. The tubes 88 are connected to the TOBI 78, for example, using a sliding joint with piston ring 100. Alternatively, the tubes 88 may be hard mounted where the tube stiffness is designed to alleviate thermal stresses. Once fed to the TOBI 78, the plenum 86 is used to force circumferential mixing of the cooling fluid with the first vane prior to injection.

In operation, the cooling fluid is supplied to the turbine rotor 76 by supplying a cooling fluid to the TOBI 78 through multiple discrete apertures 96. The multiple discrete tubes 88 fluidly connect the cooling fluid source 168 to the TOBI 78. The diffuser flow D and the buffer R flow are supplied respectively to the diffuser case 64 and the bearing compartment 74. The diffuser flow D and the buffer flow R are separate from the cooling fluid supplied to the tangential on-board injector 78.

Cooled cooling air is fed directly to the TOBI, either mixed or unmixed with P3 (not shown), to provide the desired temperature. The discrete TOBI feed tube arrangement allows for flexibility in the control of both temperature and flow while also allowing the cooling fluid to be routed independent of other flows in the combustor section, if desired.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A tangential on-board injector assembly for a gas turbine engine comprising:
   an annular housing including a plenum, and a flange extending radially outward from the annular housing, and the annular housing includes a circumferential array of tangential on-board injector vanes arranged downstream from the plenum;
   a diffuser case secured to the flange; and
   a plurality of discrete tubes fluidly connected to the plenum and configured to provide a cooling fluid to the annular housing, wherein the tubes each have an end arranged radially interiorly of the diffuser case.

2. The assembly according to claim 1, comprising a circumferential array of turbine vanes secured to the flange.

3. The assembly according to claim 2, comprising pins removably securing an inner diameter platform of the turbine vanes to the flange.

4. The assembly according to claim 1, wherein the annular housing includes a circumferential array of apertures, and the tubes each include a neck received in and sealed relative to the respective aperture.

5. A gas turbine engine comprising:
   a combustor section arranged fluidly between a compressor section and a turbine section;
   a cooling fluid source configured to provide a cooling fluid;
   a tangential on-board injector having an annular housing including a plenum;
   a diffuser case secured to the annular housing and arranged about a combustor housing in the combustor section; and
   a plurality of discrete tubes fluidly connect the cooling fluid source and configured to provide a tangential on-board injector flow to the plenum, wherein the tubes each have an end arranged radially interiorly of the diffuser case.

6. The gas turbine engine according to claim 5, wherein the turbine section includes a rotor supporting turbine blades, the tangential on-board injector configured to supply the cooling fluid to the rotor.

7. The gas turbine engine according to claim 5, wherein the compressor section provides a bleed air that corresponds to the cooling fluid.

8. The gas turbine engine according to claim 7, wherein the cooling fluid source includes a heat exchanger.

9. The gas turbine engine according to claim 5, wherein the diffuser case is configured to receive a diffuser flow, the diffuser flow discrete from the tangential on-board injector flow.

10. The gas turbine engine according to claim 5, comprising a flange extending radially outward from the annular housing, and a circumferential array of turbine vanes secured to the flange.

11. The gas turbine engine according to claim 10, comprising pins removably securing an inner diameter platform of the turbine vanes to the flange.

12. The gas turbine engine according to claim 5, wherein the annular housing includes a circumferential array of apertures, and the tubes each include a neck received in and sealed relative to the respective aperture, and the annular housing includes a circumferential array of tangential on-board injector vanes arranged downstream from the plenum.

13. The gas turbine engine according to claim 5, comprising a bearing supporting the rotor for rotation relative to an engine static structure, the bearing arranged in a bearing compartment that is configured to receive a buffer flow, the buffer flow discrete from the tangential on-board injector flow.

14. The gas turbine engine according to claim 5, wherein the diffuser case is configured to receive a diffuser flow, and a bearing supporting the rotor for rotation relative to an engine static structure, the bearing arranged in a bearing compartment that is configured to receive a buffer flow, the diffuser flow and the buffer flow discrete from the tangential on-board injector flow.

15. A method of supply fluid to a turbine rotor, comprising the steps of:

supplying a cooling fluid to a tangential on-board injector through multiple discrete apertures at a location radially interiorly of a diffuser case that surrounds a combustor.

16. The method according to claim 15, wherein multiple discrete tubes fluidly connect a cooling fluid source to the tangential on-board injector.

17. The method according to claim 15, comprising the step of supplying a diffuser flow and a buffer flow respectively to the diffuser case and a bearing compartment, the diffuser flow and the buffer flow separate from the cooling fluid supply to the tangential on-board injector.

\* \* \* \* \*